United States Patent
Reel (10) Patent No.: US 9,096,155 B2
(45) Date of Patent: Aug. 4, 2015

(54) ADJUSTABLE VEHICLE HEAD RESTRAINT ASSEMBLY

(71) Applicant: Honda Motor Co., Ltd., Tokyo (JP)

(72) Inventor: Travis M. Reel, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 14/066,572

(22) Filed: Oct. 29, 2013

(65) Prior Publication Data

US 2015/0115681 A1  Apr. 30, 2015

(51) Int. Cl.
*B60N 2/48* (2006.01)

(52) U.S. Cl.
CPC ............ *B60N 2/4864* (2013.01); *B60N 2/4805* (2013.01); *B60N 2/4808* (2013.01); *B60N 2/4838* (2013.01)

(58) Field of Classification Search
CPC ...... B60N 2/48; B60N 2/4805; B60N 2/4808; B60N 2/4838; B60N 2/4864
USPC .................................................. 297/391, 408
See application file for complete search history.

(56) References Cited

U.S. PATENT DOCUMENTS

| | | | |
|---|---|---|---|
| 4,191,422 A | | 3/1980 | Inasawa et al. |
| 4,265,482 A | * | 5/1981 | Nishimura et al. ............ 297/391 |
| 4,278,291 A | | 7/1981 | Asai |
| 4,304,439 A | * | 12/1981 | Terada et al. .................. 297/409 |
| 4,640,549 A | * | 2/1987 | Yokota ........................... 297/410 |
| 4,779,929 A | * | 10/1988 | Kuchemann .................... 297/408 |
| 4,856,848 A | * | 8/1989 | O'Sullivan et al. ........... 297/391 |
| 6,983,995 B1 | | 1/2006 | Veine et al. |
| 7,455,363 B2 | * | 11/2008 | Chung .......................... 297/407 |
| 7,631,932 B2 | | 12/2009 | Hoffmann |
| 7,677,658 B2 | | 3/2010 | Choi |
| 8,146,997 B2 | | 4/2012 | Sobieski et al. |
| 8,182,042 B2 | | 5/2012 | Reel et al. |
| 8,303,039 B2 | | 11/2012 | Mueller et al. |
| 2008/0296952 A1 | | 12/2008 | Choi |
| 2013/0049428 A1 | | 2/2013 | Reel |

FOREIGN PATENT DOCUMENTS

DE    3529735    3/1986

* cited by examiner

Primary Examiner — Milton Nelson, Jr.
(74) Attorney, Agent, or Firm — Rankin, Hill & Clark LLP (57) ABSTRACT

A vehicle head restraint assembly includes a support frame for supporting a head restraint cushion, a stay configured to connect with an associated vehicle seatback and a slide pivot bracket mechanism connected with the support frame and the stay. The slide pivot bracket mechanism is configured to allow for selective movement of the support frame with respect to the stay along a translational axis. The slide pivot bracket mechanism includes a lower bar extending along the translational axis and a plurality of teeth extending upward from the lower bar to define position recesses for receiving the support frame and inhibit movement of the support frame with respect to the stay when the support frame is received in one of the position recesses.

17 Claims, 6 Drawing Sheets

ADJUSTABLE VEHICLE HEAD RESTRAINT ASSEMBLY

BACKGROUND

Vehicle head restraints extend above a seatback of a vehicle seat. Known head restraints are typically adjustable in a vertical direction. Some known head restraints are also adjustable in a longitudinal direction, i.e., in the direction of travel for the vehicle. Of these known head restraints that are longitudinally adjustable, some include a rack and pinion arrangement. One such longitudinally adjustable head restraint includes a pinion that is rotated by an operator turning a knob. Another known longitudinally adjustable head restraint includes a pinion that is moveable after depressing a laterally disposed actuator member. Many known longitudinally adjustable head restraints tend to include a complicated or cumbersome locking mechanism.

SUMMARY

According to one aspect, a vehicle head restraint assembly includes a support frame for supporting a head restraint cushion, a stay configured to connect with an associated vehicle seatback and a slide pivot bracket mechanism connected with the support frame and the stay. The slide pivot bracket mechanism is configured to allow for selective movement of the support frame with respect to the stay along a translational axis. The slide pivot bracket mechanism includes a lower bar extending along the translational axis and a plurality of teeth extending upward from the lower bar to define position recesses for receiving the support frame and inhibit movement of the support frame with respect to the stay when the support frame is received in one of the position recesses.

According to another aspect, a vehicle head restraint assembly includes a stay configured to connect with an associated vehicle seatback and a support frame for connecting a head restraint cushion. The support frame is connected with the stay in the manner that allows the support frame to move relative to the stay. The vehicle head restraint assembly further includes a slide pivot bracket having a bracket lower bar and spaced apart teeth extending therefrom to define position recesses for accommodating the support frame. The support frame is moveable among the position recesses for moving the support frame relative to the stay and held in a select one of the position recesses by the spaced apart teeth.

According to a further aspect, a vehicle head restraint assembly includes a stay extending upward from an associated vehicle seatback, a slide pivot bracket fixedly mounted to the stay, and a support frame having a head restraint cushion overmolded thereon arranged for pivoting and sliding movement relative to the slide pivot bracket to move the head restraint cushion relative to the associated vehicle seatback and maintain the support frame in a selected position relative to the associated vehicle seatback, wherein the slide pivot bracket includes teeth defining positions for the support frame.

DETAILED DESCRIPTION

Figure 1:
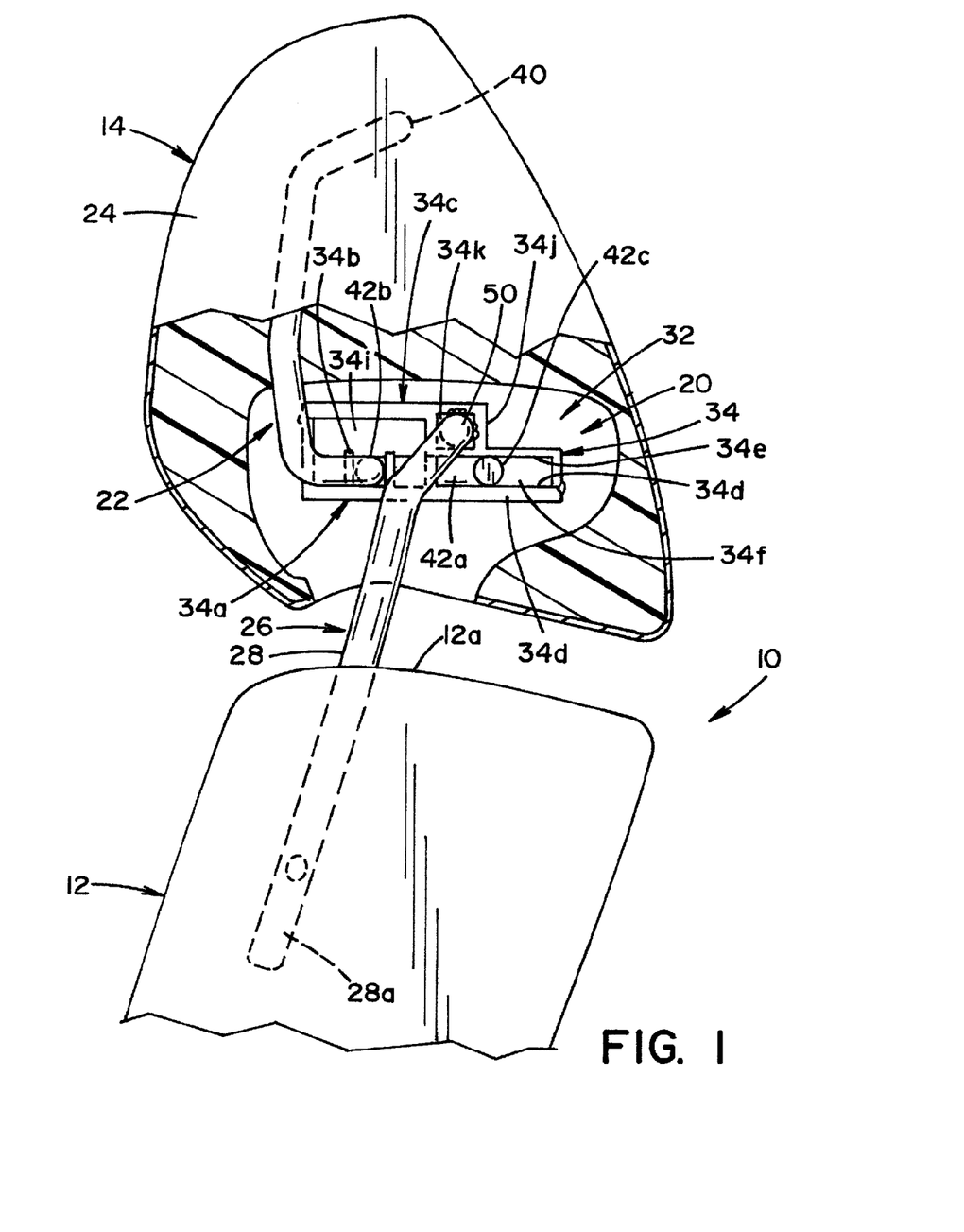
FIG. 1 is a side elevation view, partially in cross-section, of an upper portion of a vehicle seat including a head restraint assembly according to an exemplary embodiment showing a support frame of the head restraint assembly in an intermediate position.
Figure 2:
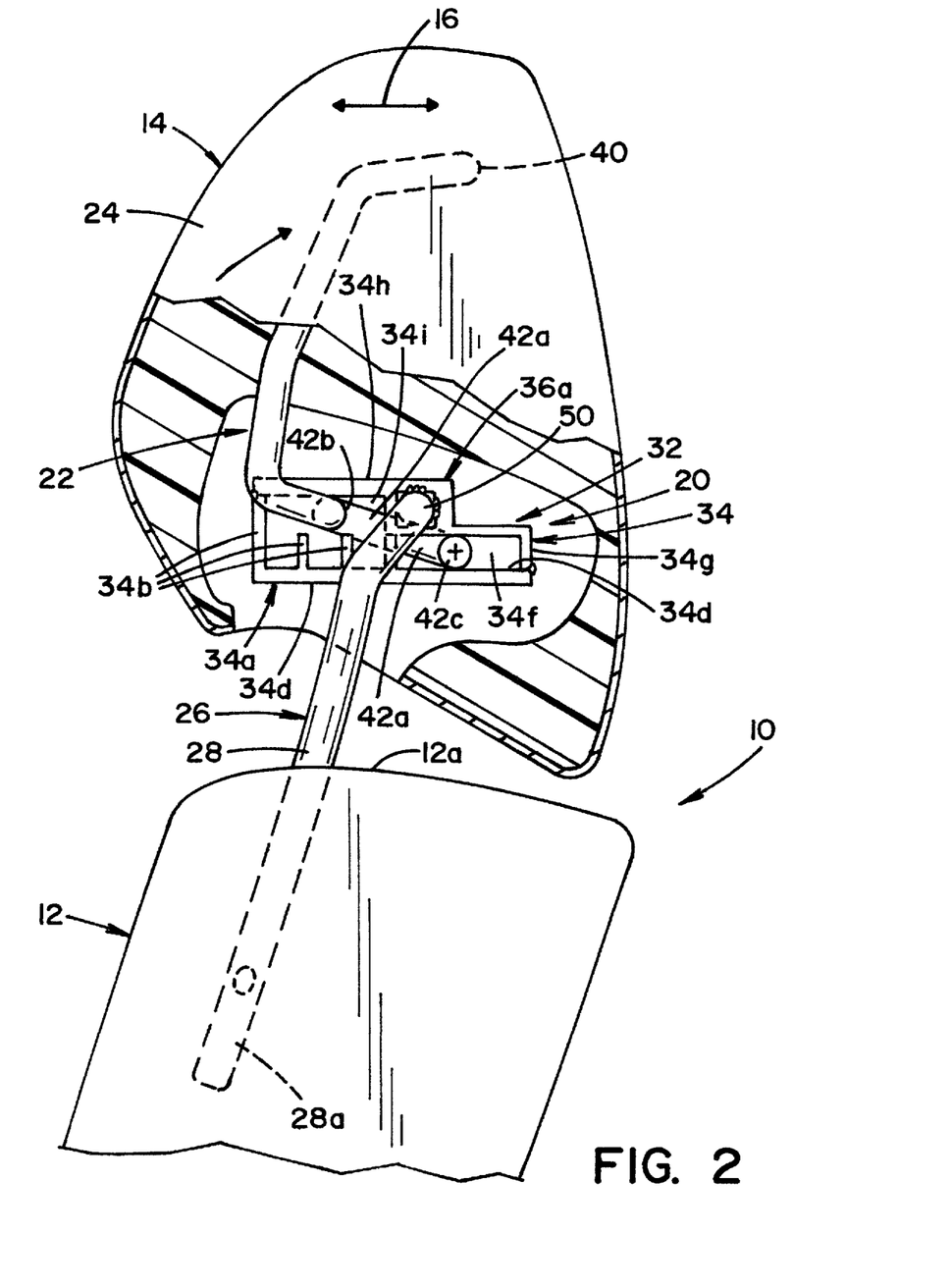
FIG. 2 is a side elevation view, partially in cross-section, similar to FIG. 1 but showing the support frame being pivoted so that the support frame can be moved relative to the vehicle seatback to another position.
Figure 3:
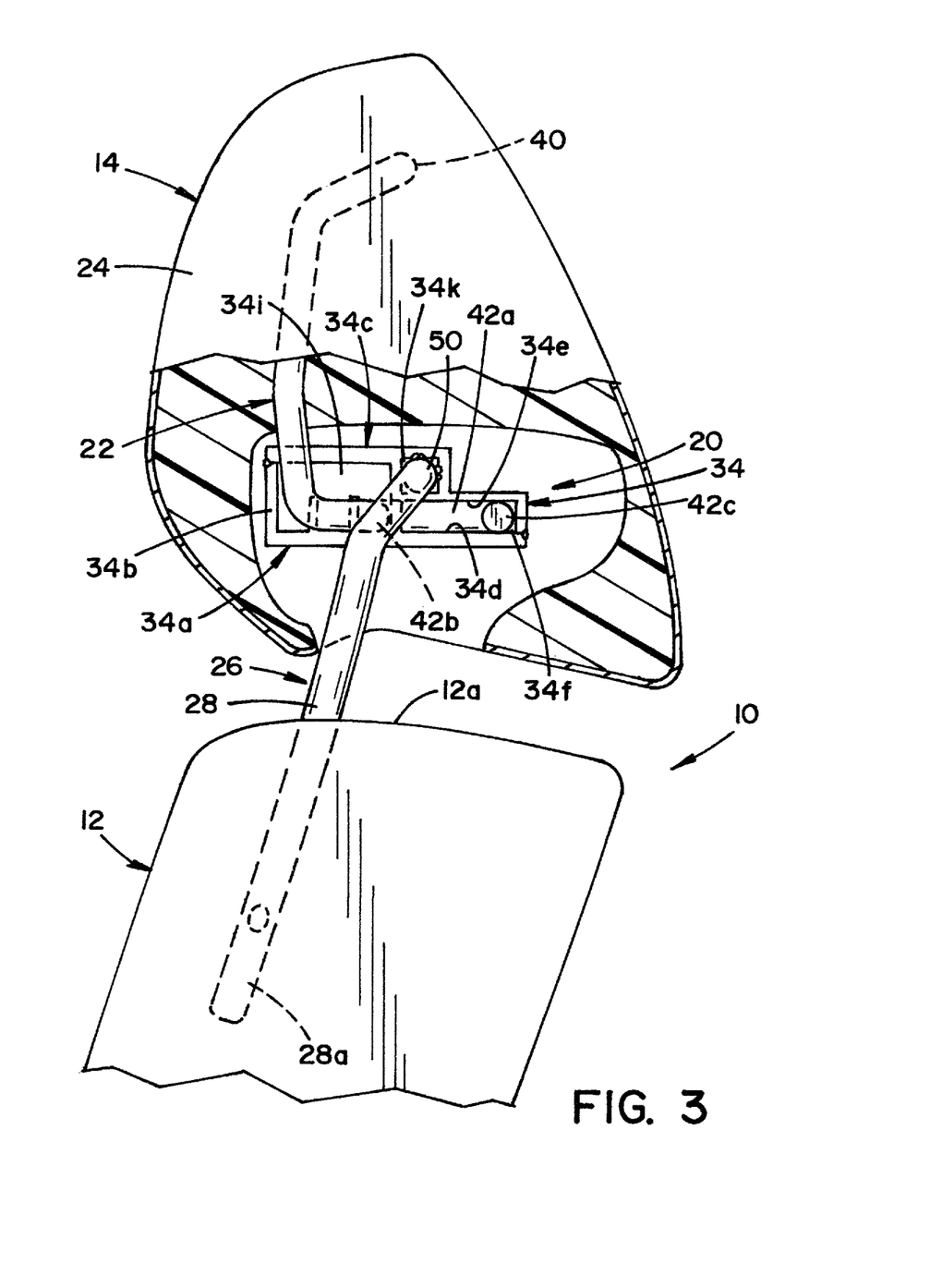
FIG. 3 is a side elevation view, partially in cross-section, similar to FIG. 1 but showing the support frame moved to a rearward-most position.
Figure 4:
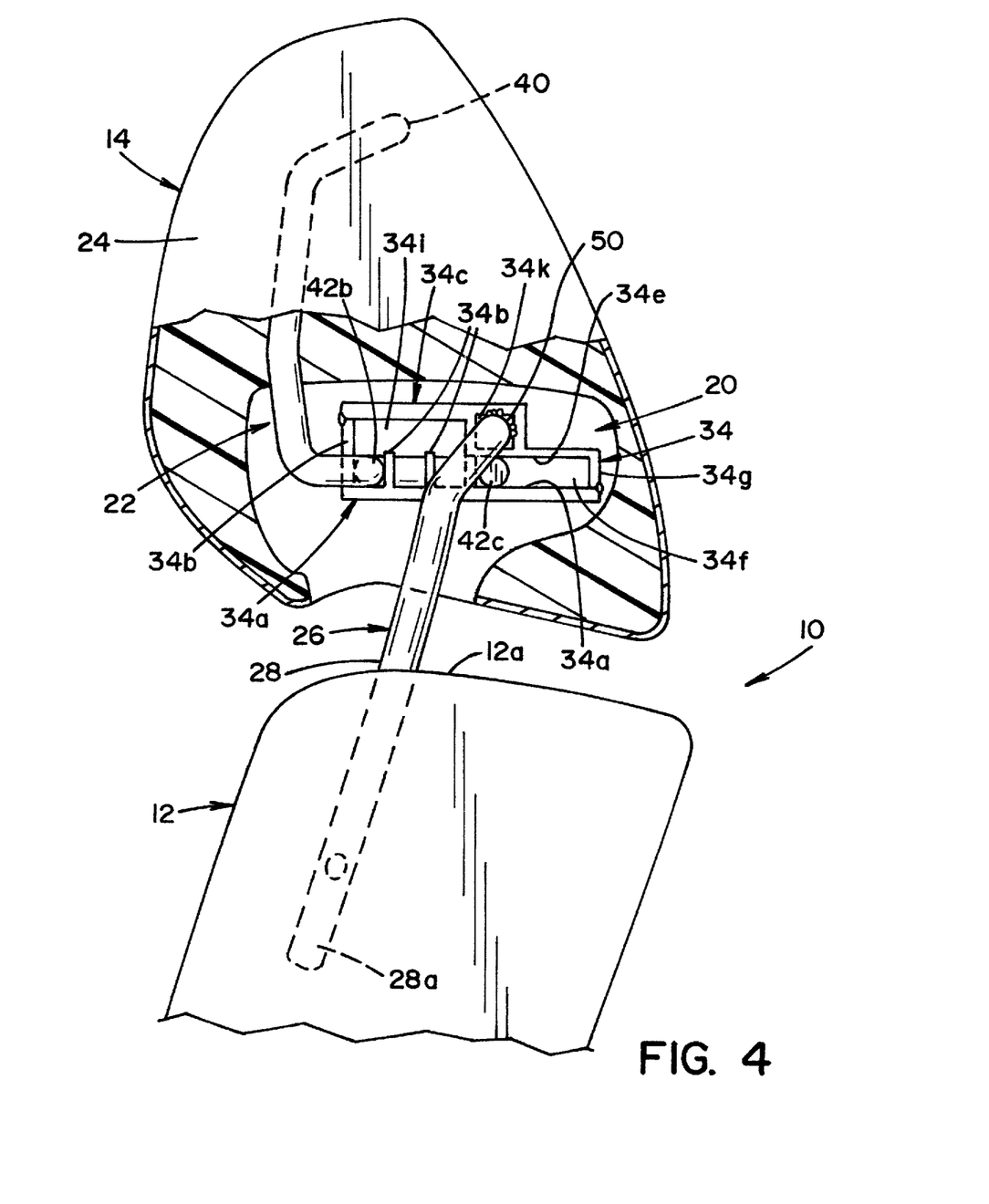
FIG. 4 is a side elevation view, partially in cross-section, similar to FIG. 1 but showing the support frame in a forward-most position.

Referring now to the drawings wherein the showings are for purposes of illustrating one or more exemplary embodiments and not for purposes of limiting same, FIGS. 1-4 illustrate a vehicle seat 10 including a seatback 12 and a head restraint 14 connected with the seatback 12. As shown in FIGS. 1-4, the head restraint 14 is moveable with respect to the seatback 12 along a translational axis 16 (FIG. 2), which can be generally parallel with a direction of travel for the vehicle (not shown) in which the vehicle seat 10 is located. FIG. 1 depicts the head restraint 14 in an intermediate or middle position. FIG. 2 depicts the head restraint 14 pivoted out of the middle position for movement to another position. FIG. 3 depicts the head restraint 14 in a rear-most position. FIG. 4 depicts the head restraint 14 in a forward-most position.

Figure 5:
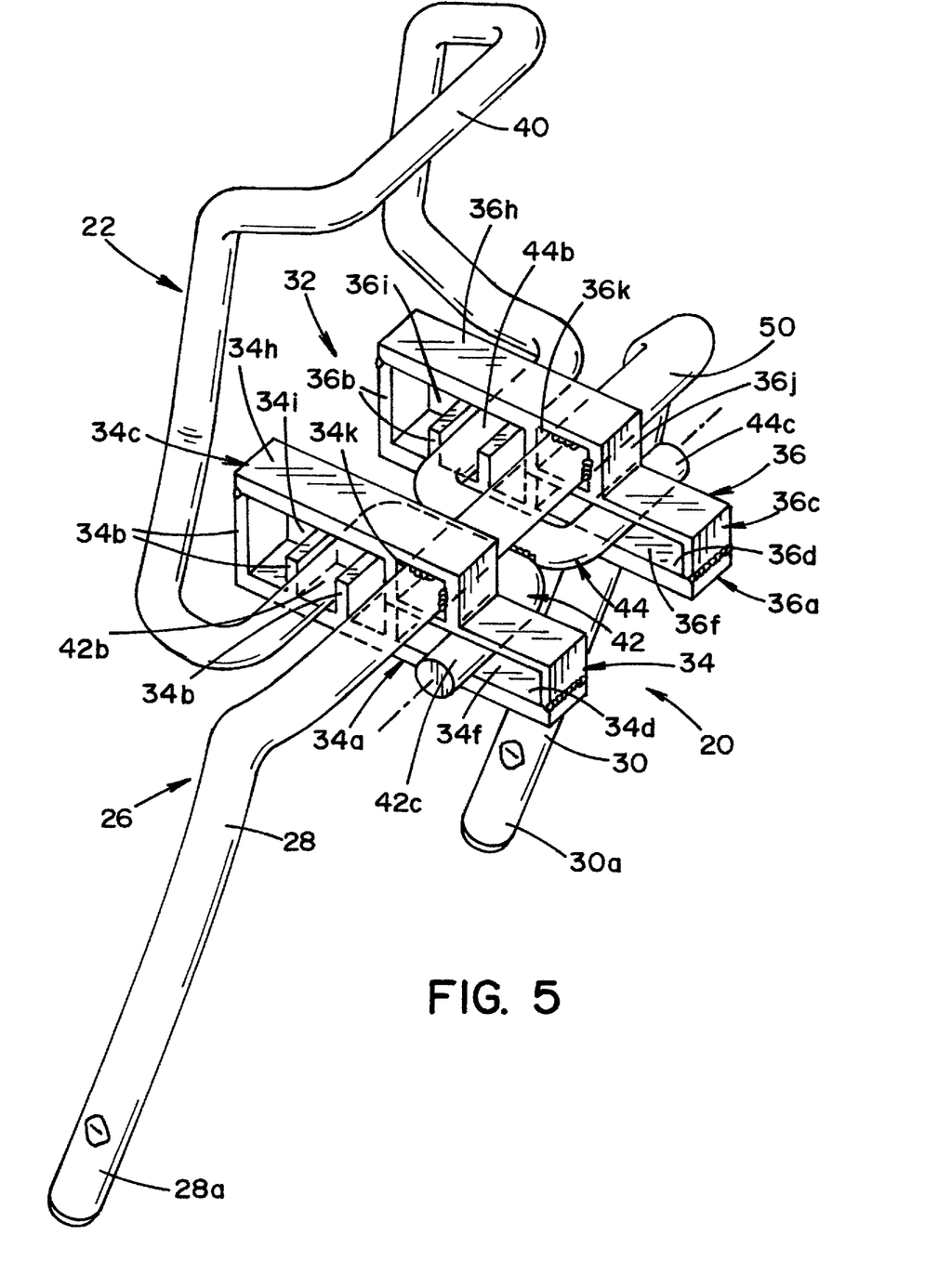
FIG. 5 is an isolated perspective view of a slide pivot bracket connecting the support frame to a stay that is itself connected to the vehicle seatback.
Figure 6:
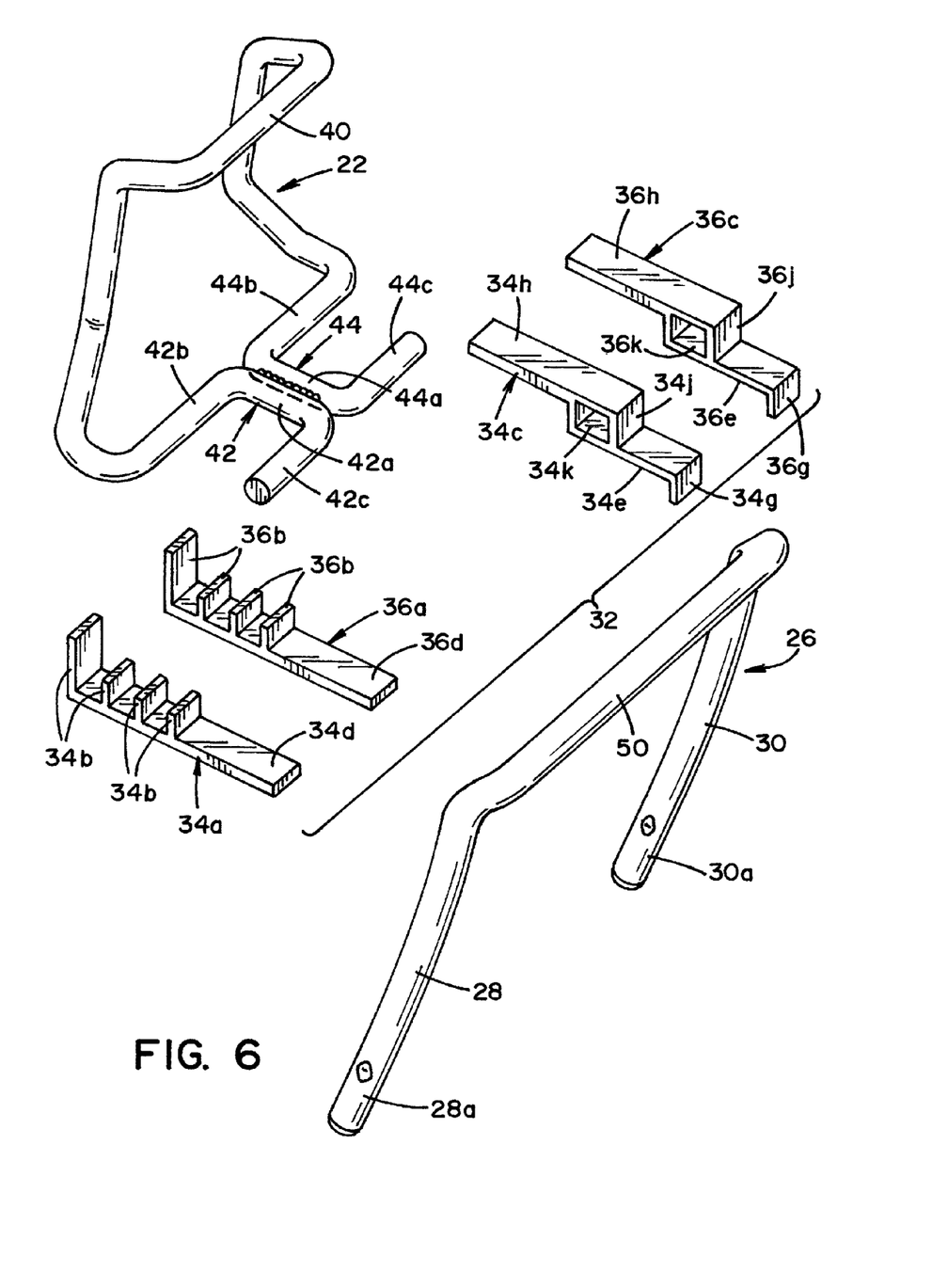
FIG. 6 is an exploded perspective view of the slide pivot bracket, the support frame and the stay.

With additional reference to FIGS. 5 and 6, a vehicle head restraint assembly 20 is illustrated that includes a support frame 22 for supporting a head restraint cushion 24 of the head restraint 14. The vehicle head restraint assembly 20 also includes a stay 26 configured to connect with the vehicle seatback 12. In the depicted embodiment, the stay 26 includes a left stay leg 28 and a right stay leg 30, though this is not required. Also in the depicted embodiment, the left stay leg 28 is a mirror image of the right stay leg 30, though this too is not required.

The vehicle head restraint assembly 20 further includes a slide pivot bracket mechanism 32 connected with the support frame 22 and the stay 26. As will be described in more detail below, the slide pivot bracket mechanism 32 is configured to allow for selective movement of the support frame 22 with respect to the stay 26 along the translational axis 16 (FIG. 2). In the illustrated embodiment, the slide pivot bracket mechanism 32 includes a left bracket 34 and a right bracket 36, though this is not required. Also in the depicted embodiment, the left bracket 34 is identical to the right bracket 36, though this too is not required.

Each of the right and left brackets 34, 36 includes a lower bar (lower bar 34a on left bracket 34 and lower bar 36a on right bracket 36) that extends along the translational axis 16 with a plurality of teeth (teeth 34b on the left bracket 34 and teeth 36b on the right bracket 36) extending upward from the lower bar 34a or 36a to define position recesses for receiving the support frame 22 and inhibit movement of the support frame 22 with respect to the stay 26 when the stay 26 is received in one of the position recesses. Each of the left bracket 34 and right bracket 36 can also include an upper bar (upper bar 34c on left bracket 34 and upper bar 36c on right bracket 36) that can be fixedly secured, respectively, to the lower bars 34a, 36a, such as via welding.

The support frame 22 in the illustrated embodiment can be a bent and/or formed metal rod having a U-shaped section 40 and base sections 42, 44 at terminal ends of the U-shaped section 40. The support frame 22 provides a rigid member for supporting the head restraint cushion 24. The U-shaped section 40 generally defines a vertical plane along a lower region and bends to generally define an angled plane in an upper region of the U-shaped section 40. The support frame 22 bends at the terminal ends of the U-shaped section transitioning into the base sections 42, 44, which extend rearwardly from the U-shaped section 40. In the illustrated embodiment, the base sections 42, 44 are generally horizontally oriented. Also in the illustrated embodiment, the base sections 42, 44 are welded together along central portions 42a, 44a, respectively.

The stay 26 of the illustrated embodiment can also be a bent and/or formed metal rod having a U-shaped configuration including a cross member 50 and the left and right stay legs 28, 30. A lower end of the stay 26 (i.e., lower ends 28a, 30a of the legs 28, 30) is configured to be received in the vehicle seatback 12 as shown in FIGS. 1-4 and an upper end of the stay (i.e., cross member 50) is configured to be vertically spaced from an upper edge 12a of the seatback 12.

The support frame 22 includes an engaging section extending along a lateral axis oriented perpendicularly relative to the translational axis 16, wherein the engaging section is received in one of the position recesses defined by the plurality of teeth 34b, 36b. In the illustrated embodiment, the engaging section comprises segments 42b, 44b of the base sections 42, 44. Each of the lower bars 34a, 36a includes a sliding segment 34d, 36d disposed rearwardly of a rearward-most tooth of the plurality of teeth 34b, 36b and the support frame 22 includes a load bearing section disposed in parallel relation to the engaging section (i.e., segments 42b, 44b) that slideably contacts the sliding segments 34d, 36d. In the illustrated embodiment, the load bearing section of the support frame 22 is comprised of distal segments 42c, 44c of the base sections 42, 44, the central portions or segments 42a, 44a spacing apart the segments 42b, 44b from the distal segments 42c, 44c. As will be described in more detail below, the support frame 22 can be pivoted about the load bearing section (i.e., the distal segments 42c, 44c) to move the support frame 22 from a selected one of the position recesses to another one of the position recesses.

Each of the upper bars 34c, 36c includes a sliding segment cage portion 34e, 36e disposed above, respectively, the sliding segments 34d, 36d to limit vertical movement of the load bearing section (i.e., distal segments 42c, 44c) relative to the sliding segments 34d, 36d. In particular, in the illustrated embodiment, each sliding segment cage portion 34e, 36e extends from a rearward-most of the plurality of teeth 34b, 36b to a distal end of the respective sliding segments 34d, 36d to define a sliding segment contained area 34f, 36f. Depending wall segments 34g, 36g, which form the respective distal edges, can close off the sliding segment contained areas 34f, 36f. The load bearing section of the support frame 22, comprised of the distal segments 42c, 44c, is received through the sliding segment contained areas 34f, 36f and inhibited from moving beyond the sliding segment contained areas 34f, 36f.

As shown in the illustrated embodiment, each of the plurality of teeth 34b, 36b extends orthogonally upward from, respectively, the lower bars 34a, 36a. The upper bars 34c, 36c include, respectively, tooth cage portions 34h, 36h disposed above the plurality of teeth 34b, 36b to limit vertical movement of the engaging section (i.e., segments 42b, 44b) relative to the lower bars 34a, 36a. Each of the tooth cage portions 34h, 36h extends from a forward-most tooth of the plurality of teeth 34b, 36b to a rearward-most tooth of the plurality of teeth 34b, 36b to define, respectively, tooth contained areas 34i, 36i. The engaging section of the support frame 22 comprised of the segments 42b, 44b is received through the tooth contained areas 34i, 36i and inhibited from moving beyond the tooth contained areas 34i, 36i.

Each of the upper bars 34c, 36c can also include, respectively, a stay mounting portion 34j, 36j connected, respectively, to the sliding segment cage portions 34e, 36e and the tooth cage portions 34h, 36h to define a closed stay contained area 34k, 36k through which the cross member 50 of the stay 26 extends and is inhibited from moving relative to the slide pivot bracket mechanism 32. In the illustrated embodiment, at least one of the most rear-most tooth and/or the forward-most tooth extends a greater distance from the lower bar 34a, 36a than an adjacent tooth. In particular, in the illustrated embodiment, the forward-most tooth of the plurality of teeth 34b, 36b extends a greater distance from the respective lower bar 34a, 36a than an adjacent tooth.

In operation, the segments 42b, 44b of the support frame 22 can be received in one of the positions defined by the teeth 34b, 36b. As shown in FIG. 1, the segments 42b, 44b are received in the middle or intermediate position defined by the teeth 34b, 36b. To move the head restraint 14, the head restraint 14 is lifted and pivoted as shown in FIG. 2 so that the segments 42b, 44b are removed from the middle position defined by the teeth 34b, 36b to allow sliding movement along the translational axis 16. Such sliding movement is limited by the sliding segment contained areas 34f, 36f. That is, the distal segments 42c, 44c cannot move beyond the area defined by the sliding segment contained areas 34f, 36f. Likewise, the tooth contained areas 34i, 36i also limits the extent of forward and rearward movement of the support frame 22 relative to the slide pivot bracket mechanism 32, which is fixably mounted to the stay 26.

The head restraint 14 can be moved to the rearward-most position shown in FIG. 3 wherein the segments 42b, 44b are again installed in a position, this time the rear-most position, defined by the teeth 34b, 36b. Alternatively, the head restraint 14 can be moved to its forward-most position wherein the segments 42b, 44b are received in the forward-most position defined by the teeth 34b, 36b, as shown in FIG. 4.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle head restraint assembly, comprising:
a support frame for supporting a head restraint cushion;
a stay configured to connect with an associated vehicle seat back; and
a slide pivot bracket mechanism connected with the support frame and the stay, the slide pivot bracket mechanism being configured to allow for selective movement of the support frame with respect to the stay along a translational axis, the slide pivot bracket mechanism including a lower bar extending along the translational axis and a plurality of teeth extending upward from the lower bar to define position recesses for receiving the support frame and inhibit movement of the support frame with respect to the stay when the support frame is received in one of the position recesses, wherein the slide pivot bracket mechanism further includes a tooth cage portion disposed above the lower bar to limit vertical movement of the support frame with respect to the lower bar, the tooth cage portion extending along the translational axis from a rear-most tooth of the plurality of teeth to a forward-most tooth of the plurality of teeth to define a tooth contained area for the support frame.

2. The vehicle head restraint assembly of claim 1, wherein each of the plurality of teeth extends orthogonally upward from the lower bar.

3. The vehicle head restraint assembly of claim 1, wherein a lower end of the stay is configured to be received in the associated vehicle seat back and an upper end of the stay is configured to be vertically spaced from an upper edge of the associated seat back.

4. The vehicle head restraint assembly of claim 1, wherein the support frame includes an engaging section extending along a lateral axis oriented perpendicularly relative to the translational axis, the engaging section received through the tooth contained area and inhibited from moving beyond the tooth contained area.

5. The vehicle head restraint assembly of claim 1, wherein at least one of the rear-most tooth and the forward-most tooth extends a greater distance from the lower bar than an adjacent tooth.

6. The vehicle head restraint assembly of claim 1 wherein the support frame includes an engaging section extending along a lateral axis oriented perpendicularly relative to the translational axis, the engaging section received in one of the position recesses defined by the plurality of teeth.

7. The vehicle head restraint assembly of claim 6, wherein the lower bar includes a sliding segment disposed rearwardly of a rearward-most tooth of the plurality of teeth and the support frame includes a load bearing section disposed in parallel relation to the engaging section that slidably contacts the sliding segment, the support frame pivoted about the load bearing section to move the support frame from a selected one of the position recesses to another one of the position recesses.

8. The vehicle head restraint assembly of claim 7, wherein the slide pivot bracket mechanism includes a sliding segment cage portion disposed above the sliding segment to limit vertical movement of the load bearing section relative to the sliding segment.

9. The vehicle head restraint assembly of claim 8, wherein the sliding segment cage portion extends from a rearward-most tooth of the plurality of teeth to a distal edge of the sliding segment to define a sliding segment contained area, the load bearing section received through the sliding segment contained area and inhibited from moving beyond the sliding segment contained area.

10. The vehicle head restraint assembly of claim 6, wherein the slide pivot bracket mechanism includes a tooth cage portion disposed above the plurality of teeth to limit vertical movement of the engaging section relative to the lower bar.

11. The vehicle head restraint assembly of claim 10, wherein the tooth cage portion extends from a forward-most tooth of the plurality of teeth to a rearward-most tooth of the plurality of teeth to define a tooth contained area, the engaging section received through the tooth contained area and inhibited from moving beyond the tooth contained area.

12. The vehicle head restraint assembly of claim 11, wherein the lower bar includes a sliding segment disposed rearwardly of the rearward-most tooth of the plurality of teeth and the support frame includes a load bearing section disposed in parallel relation to the engaging section that slidably contacts the sliding segment, the support frame pivoted about the load bearing section to move the support frame from a selected one of the position recesses to another one of the position recesses, the slide pivot bracket mechanism including a sliding segment cage portion disposed above the sliding segment to limit vertical movement of the load bearing section relative to the sliding segment, and wherein the sliding segment cage portion extends from a rearward-most tooth of the plurality of teeth to a distal edge of the sliding segment to define a sliding segment contained area, the load bearing section received through the sliding segment contained area and inhibited from moving beyond the sliding segment contained area.

13. The vehicle head restraint assembly of claim 12, wherein the slide pivot bracket mechanism further includes a stay mounting portion connected to the sliding segment cage portion and the tooth cage portion to define a stay contained area through which a cross member of the stay extends and is inhibited from moving relative to the slide pivot bracket mechanism.

14. A vehicle head restraint assembly, comprising:
a stay configured to connect with an associated vehicle seat back;
a support frame for supporting a head restraint cushion, the support frame being connected with the stay in a manner that allows the support frame to move relative to the stay; and
a slide pivot bracket mechanism having a bracket lower bar and spaced apart teeth extending therefrom to define position recesses for accommodating the support frame, the support frame movable among the position recesses for moving the support frame relative to the stay and held in a select one of the position recesses by the spaced apart teeth,
wherein the lower bar includes a sliding segment against which the support frame abuts and is slidably movable, and
wherein the support frame includes:
an engaging section that is received within one of the position recesses;
a load bearing section that is received against the sliding segment; and
a connecting section connecting the engaging section and the load bearing section.

15. The vehicle head restraint assembly of claim 14, wherein the sliding segment acts as a load bearing support for the stay that is offset relative to the position recesses.

16. The vehicle head restraint assembly of claim 15, wherein the support frame includes a left lower section and a right lower section, each of the left and right lower sections including:
a respective engaging section;
a respective load bearing section, the load bearing section parallel and rearwardly disposed relative to the engaging section; and
a respective connecting section.

17. A vehicle head restraint assembly, comprising:
a stay extending upward from an associated vehicle seat back;
a slide pivot bracket mechanism fixedly mounted to the stay; and
a support frame having a head restraint cushion overmolded thereon arranged for pivoting and sliding movement relative to the slide pivot bracket mechanism to move the head restraint cushion relative to the associated vehicle seat back along a translational axis and maintain the support frame in a selected position relative to the associated vehicle seat back, wherein the slide pivot bracket mechanism includes a lower bar having teeth defining positions for the support frame, wherein the support frame includes an engaging section extending along a lateral axis oriented perpendicularly relative to the translational axis, the engaging section received in one of the positions defined by the teeth, and wherein the lower bar includes a sliding segment and the support frame includes a load bearing section that slidably contacts the sliding segment, the support frame pivoted about the load bearing section to move the support frame from a selected one of the positions to another one of the positions.

\* \* \* \* \*